(12) United States Patent
Pembroke (10) Patent No.: US 7,933,832 B2
(45) Date of Patent: Apr. 26, 2011

(54) METHODS AND SYSTEMS FOR FINANCING HEALTHCARE EXPENSES WITH A LOAN SECURED BY REAL PROPERTY

(75) Inventor: John J. Pembroke, Evergreen, CO (US)

(73) Assignee: John J. Pemboke Living Trust, Evergreen, CO (US)

( * ) Notice: Subject to any disclaimer, the term of this patent is extended or adjusted under 35 U.S.C. 154(b) by 1636 days.

(21) Appl. No.: 11/039,387

(22) Filed: Jan. 18, 2005

(65) Prior Publication Data

US 2005/0177490 A1   Aug. 11, 2005

Related U.S. Application Data

(63) Continuation-in-part of application No. 10/219,797, filed on Aug. 14, 2002.

(51) Int. Cl.
*G06Q 40/00* (2006.01)

(52) U.S. Cl. ............ 705/38; 705/35; 705/36 R (58) Field of Classification Search .......... 705/35–45; 395/236
See application file for complete search history.

(56) References Cited

U.S. PATENT DOCUMENTS

| | | | | |
|---|---|---|---|---|
| 5,644,727 | A | | 7/1997 | Atkins |
| 5,852,811 | A | * | 12/1998 | Atkins ............... 705/36 R |
| 6,385,594 | B1 | | 5/2002 | Lebda |
| 6,611,816 | B2 | | 8/2003 | Lebda |
| 6,985,886 | B1 | * | 1/2006 | Broadbent et al. ........ 705/38 |
| 2002/0023051 | A1 | * | 2/2002 | Kunzle et al. ............ 705/38 |
| 2002/0103750 | A1 | * | 8/2002 | Herzfeld ................. 705/38 |
| 2002/0198825 | A1 | | 12/2002 | Jentoft |
| 2005/0004860 | A1 | | 1/2005 | Pretell et al. |
| 2005/0010423 | A1 | * | 1/2005 | Bagbey et al. ............ 705/1 |
| 2005/0097033 | A1 | | 5/2005 | Pretell et al. |

FOREIGN PATENT DOCUMENTS

WO   WO 02/23439 A1 *  3/2002

OTHER PUBLICATIONS

Press release http://web.intuit.com/about_intuit/press_releases/2001/08-27.html.*
http://money.cnn.com/2001/11/08/yourhome/q_homeequity/index.htm.*
http://money.cnn.com/2001/12/04/yourhome/q_reversemortgage/.*
Getting money to start or expand your agencyAnonymous. Agency Sales. Irvine: May 1997. vol. 27, Iss. 5; p. 29, 3 pgs http://proquest.umi.com/pqdweb?did=11640526&sid=4&Fmt=4&clie   ntld=19649& RQT=309&VName=PQD.*
Appraisal Standards Board, USPAP (Uniform Standards of Professional Appraisal Practice) 2003, 2003 Edition, The Appraisal Foundation, U.S.A.
www.allconnect.com; Method for managing consumer selection of and ordering of utility and communications.
www.competisys.com; Integrated communications and energy provider.

* cited by examiner

*Primary Examiner* — Alexander Kalinowski
*Assistant Examiner* — Abhishek Vyas
(74) *Attorney, Agent, or Firm* — John J. Pembroke (57) ABSTRACT

Methods and systems provide a loan to a borrower. An identification of real property and a specification of medical and/or healthcare services is received. A total loan value for the real property and specified medical and/or healthcare services is calculated. Approval of the loan secured by the real property for the total loan value is requested. A closing is initiated on the loan at which a customer depository account is funded to provide future funds for payment of the expenses for the medical and/or healthcare services.

23 Claims, 7 Drawing Sheets

METHODS AND SYSTEMS FOR FINANCING HEALTHCARE EXPENSES WITH A LOAN SECURED BY REAL PROPERTY

CROSS-REFERENCES TO RELATED APPLICATIONS

This application is a continuation-in-part of U.S. patent application Ser. No. 10/219,797, entitled "SYSTEM AND METHOD FOR BUNDLING TELECOMMUNICATIONS AND UTILITIES INTO A MORTGAGE," filed Aug. 14, 2002 by John J. Pembroke, the entire disclosure of which is incorporated herein by reference for all purposes ("the parent application").

This application is related to concurrently filed U.S. Pat. Appl. No. 11/039,367, entitled "METHODS AND SYSTEMS FOR FINANCING RECURRING EXPENSES WITH A LOAN SECURED BY REAL PROPERTY" by John J. Pembroke, the entire disclosure of which is incorporated herein by reference for all purposes ("the related application"). The related application is also a continuation-in-part of the parent application.

BACKGROUND OF THE INVENTION

This application relates generally to real-property mortgages. More specifically, this application relates to methods and systems for financing recurring expenses with a loan secured by real property.

Typical property owners have a number of expenses. A common ordering of their living costs for property owners in order of expense is: their home mortgage payment, healthcare, food, energy, and telecommunications. Of these five principal expenses, only the mortgage payment provides financing over an extended period of time. The other expenses are paid as they are incurred and may be subject to substantial variations as a result of external impacts, such as when world events affect the availability, and therefore the cost, of energy sources.

It is commonly known that medical and healthcare expenses are increasing rapidly. Currently, the average premium for a family medical insurance policy in the United States is $9086/year. The average annual out-of-pocket expenses for healthcare in the United States is $2664. Medicare managed-care plans will pay an estimated $1964 in average annual out-of-pocket expenses. On average, seniors spend about $2300 per year on medicines and drugs. While these costs are already high, they are also increasing at rates that generally exceed average inflation rates, making their impact even more significant. Furthermore, the impact of these costs may sometimes take the form of a sudden unexpected cost that arises as a result of an unanticipated illness or accident.

There is, thus, a general need in the art for methods and systems that mitigate the effect of these costs.

BRIEF SUMMARY OF THE INVENTION

Embodiments of the invention provide methods and systems for providing a loan to a borrower. An identification of real property and a specification of medical and/or healthcare services is received. A total loan value for the real property and specified medical and/or healthcare services is calculated. A request is made for approval of the loan secured by the real property for the total loan value. A closing is initiated on the loan at which a customer depository account is funded to provide future funds for payment of expenses for the medical and/or healthcare services.

In some embodiments, the loan may also be secured by the specified medical and/or healthcare services. Approval of the loan may comprise initiating an appraisal of the value of the property with the specified medical and/or healthcare services and calculating a back-end ratio that omits consideration of separate payment of the expenses by the borrower. The funds in the customer depository account may be designated as a prepaid asset linked with the real property, whereby the funds in the consumer deposit account comprise a real-property interest. In one embodiment, the specification of medical and/or healthcare services comprises specification of a term for the medical and/or healthcare services.

The loan may be any number of different types of loans secured by real property in different embodiments. For example, in one embodiment, the loan comprises a mortgage, and the borrower is a buyer of the real property. In another embodiment, the loan comprises a refinance mortgage and the borrower is an owner of the real property. In a further embodiment, the loan comprises a home-equity loan or a home-equity line of credit and the borrower is an owner of the real property.

Payment of the expenses may be initiated when due. In some instances, at least some of the expenses comprise periodic expenses; in such instances, the method may further comprise periodically initiating payment of the periodic expenses. In some cases, foreclosure may be initiated against the real property and against the customer depository account in response to a default by the borrower on terms of the loan. Foreclosed funds in the customer depository account may be directed to be paid to the lender or supplier of the medical and/or healthcare services. Embodiments of the invention may permit a value of the customer depository account to be increased by depositing additional funds by the borrower or a third party after closing into the customer depository account; this has the effect of extending a useable term of the customer depository account for payment of the expenses.

In some embodiments, a specification may be received of products and/or services distinct from the medical and/or healthcare services. In such embodiments, calculating the total loan value comprises calculating the total loan value for the value for the real property, the specified medical and/or healthcare products, and the products and/or services distinct from the medical and/or healthcare services. The customer depository account is funded to provide future funds for payment for the medical and/or healthcare services and for payment of expenses for the products and/or services distinct from the medical and/or healthcare services. In one such embodiment, the customer depository account comprises a plurality of customer depository accounts, each of the plurality of customer depository accounts being identified with a distinct subset of the products and/or services and the medical and/or healthcare services. A transfer of funds may thus sometimes be effected among at least some of the plurality of customer depository accounts. In another such embodiment, the customer depository account is segregated for separated tracking into distinct subsets identified with the products and/or services and medical and/or healthcare services. An identification of the funds among the distinct subsets may thus sometimes be changed.

The methods of the present invention may be embodied in a computer-readable storage medium having a computer-readable program embodied therein for directing operation of a computer system. Such a computer system may include a communications system, a processor, and a storage device. The computer-readable program includes instructions for operating the computer system to provide a loan to a borrower in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Embodiments of the invention insulate consumers from the effects of high, and increasing, medical and healthcare costs by providing a loan secured by real property that may be used to finance medical and healthcare services. In some instances, security for the loan may be provided by the real property and some other property, such as by a cash value of the medical and healthcare services in one embodiment. Some of the medical and healthcare services that may be financed provide "recurring expenses," which is used herein to refer to expenses that occur more than once and are not satisfied by single payments. In some instances, the recurring expenses include "periodic expenses," which are expenses that arise on a regular repeatable basis, such as payments that are to be made every month, every quarter, every year, or on some other periodic timetable.

Examples of medical and healthcare expenses include fees for physician services and the services of other medical practitioners, including both general practitioners and specialists; dental, vision, and chiropractic services; medical and healthcare insurance policies and premiums; prescription and nonprescription drug costs, as well as the costs of other medical products such as syringes; hospital, nursing home, and extended-care facilities fees; fees for in-home long-term care; healthcare savings programs, and the like. Merely by way of example, monthly premiums paid for insurance coverage are examples of medical and healthcare services that result in periodic expenses, while fees for physician services that result from sudden illness or accidents are examples of medical and healthcare fees that might be recurring even if not periodic.

The secured loan is provided in embodiments of the invention by a "bundling lender," which is any entity that provides a real-estate-secured loan that bundles at least some medical and/or healthcare services. Examples of entities that may be comprised by the bundling lender include mortgage brokers, mortgage bankers, commercial banks, finance companies, credit unions, insurance companies, stock brokerage firms, and individual investors; it is not necessary according to embodiments of the invention that the bundling lender be associated with a financial institution. The bundling of the medical and/or healthcare services is coordinate by a bundling company, which interacts with the bundling lender. An overview of an environment in which the bundling company may operate in structuring the loan is illustrated schematically with the block diagram of FIG. 1, with the environment denoted generally by reference number 101.

Figure 1:
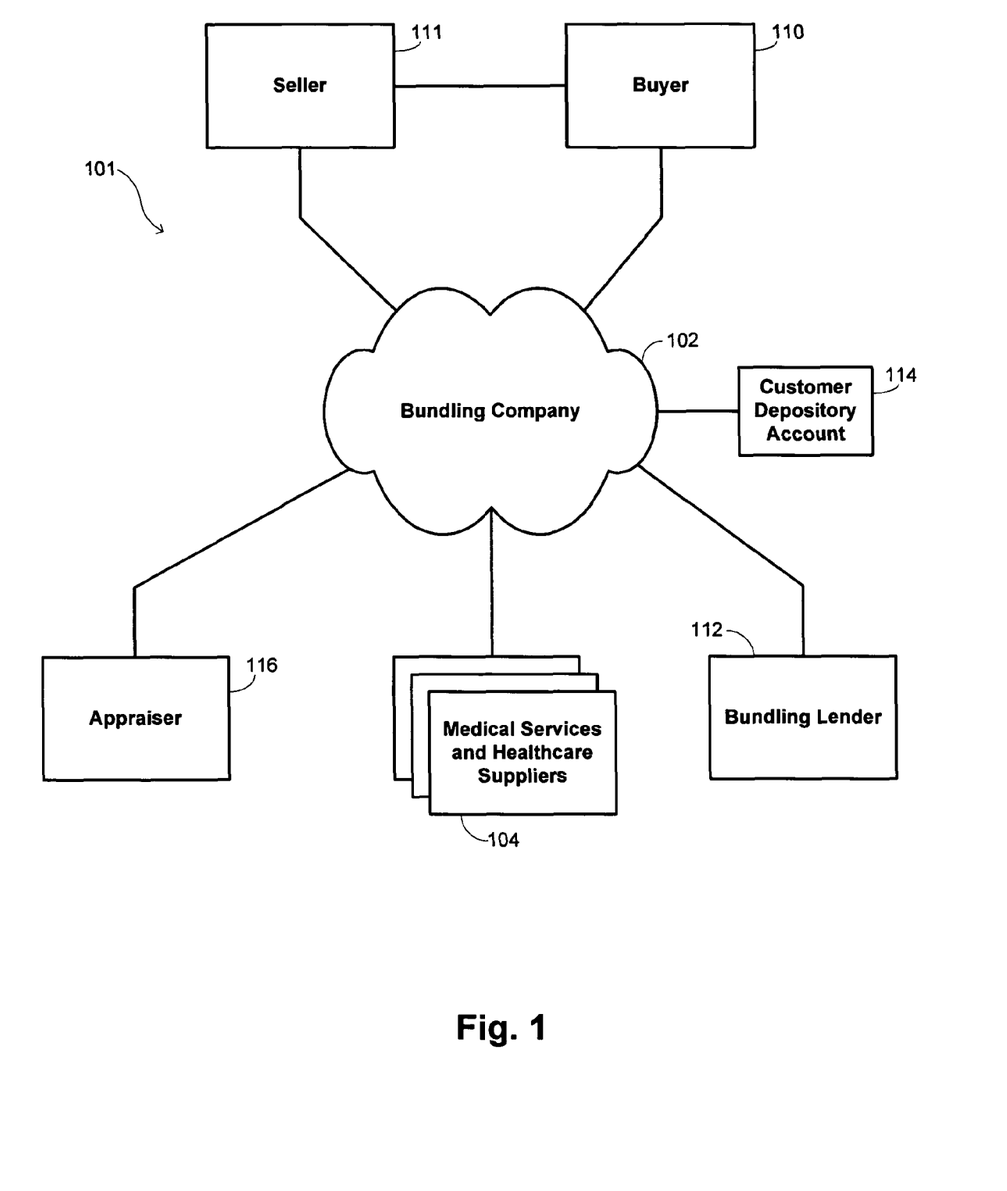
FIG. 1 provides a schematic illustration of a functional environment in which a bundling company operates in accordance with embodiments of the invention.

The bundling company 102 may comprise any entity that offers bundleable medical and/or healthcare services to be included in a loan and/or that facilitates the marketing or sale of bundleable medical and/or healthcare products. Examples of bundling companies in certain specific embodiments include suppliers of products and services, mortgage bankers, mortgage brokers, real estate agents, real estate brokers, builders, land developers, financial planners, or various facilitators such as independent marketing entities, title companies, insurance companies, appraisers, etc. The bundling company 102 has relationships with one or more suppliers 104 of medical and healthcare services, such as those that provide those exemplary healthcare services enumerated above. The bundling lender 112 may negotiate discounted prices for the medical and healthcare services, using its position as an interface to large volumes of such medical and healthcare services for many potential customers to obtain very favorable prices. As described in more detail below for various embodiments, the bundling company 102 may then offer the medical and healthcare services to a buyer 110 or seller 111 of real property. The offered prices for the medical and healthcare services may be customary rates, at less than customary rates, and may include a transaction charge. The buyer and/or seller are sometimes referred to interchangeably herein as "consumers," "customers," "borrowers," or "clients," each of which may also refer generally to a homeowner, homebuyer, homebuilder, land developer, home seller, property owner, renter, or tenant, among others. In addition to interacting with the seller 111 and buyer 110, the bundling company 102 may interact with a number of other entities, examples of which include the suppliers of medical and healthcare services 104, appraisers 116, and one or more bundling lenders 112, who actually provide the loan. The bundling company may maintain a customer depository account 114, the use of which is described further below, although in some embodiments the customer depository account may be maintained by a separate institution.

Various methods of the invention are illustrated for different embodiments with the flow diagrams of FIGS. 2A-6. The method illustrated with FIG. 2A may be used in one embodiment when a seller 111 sells real property to a buyer 110. In response to the seller 111 offering the real property for sale to the buyer 110 at block 204, the buyer contacts a bundling company 102 at block 206 to coordinate obtaining the medical and healthcare services and a loan for purchasing the real property with the bundleable medical and healthcare services included. In some instances, the contact with the bundling company may conveniently proceed through another third party. Also, the buyer 110 may conveniently use a variety of different sources for identifying a bundling company 102, including computer networks, the Internet, computer software tools, and other electronic media. The bundling company 102 identifies a number of medical and healthcare products at block 208 so that a selection of the desired medical and healthcare services may be made by the buyer 110 at block 210. The selection of desired services is explained below in more detail in connection with FIG. 2B, and may include specification of a term for the services, such as a term of five years.

Figure 2A:
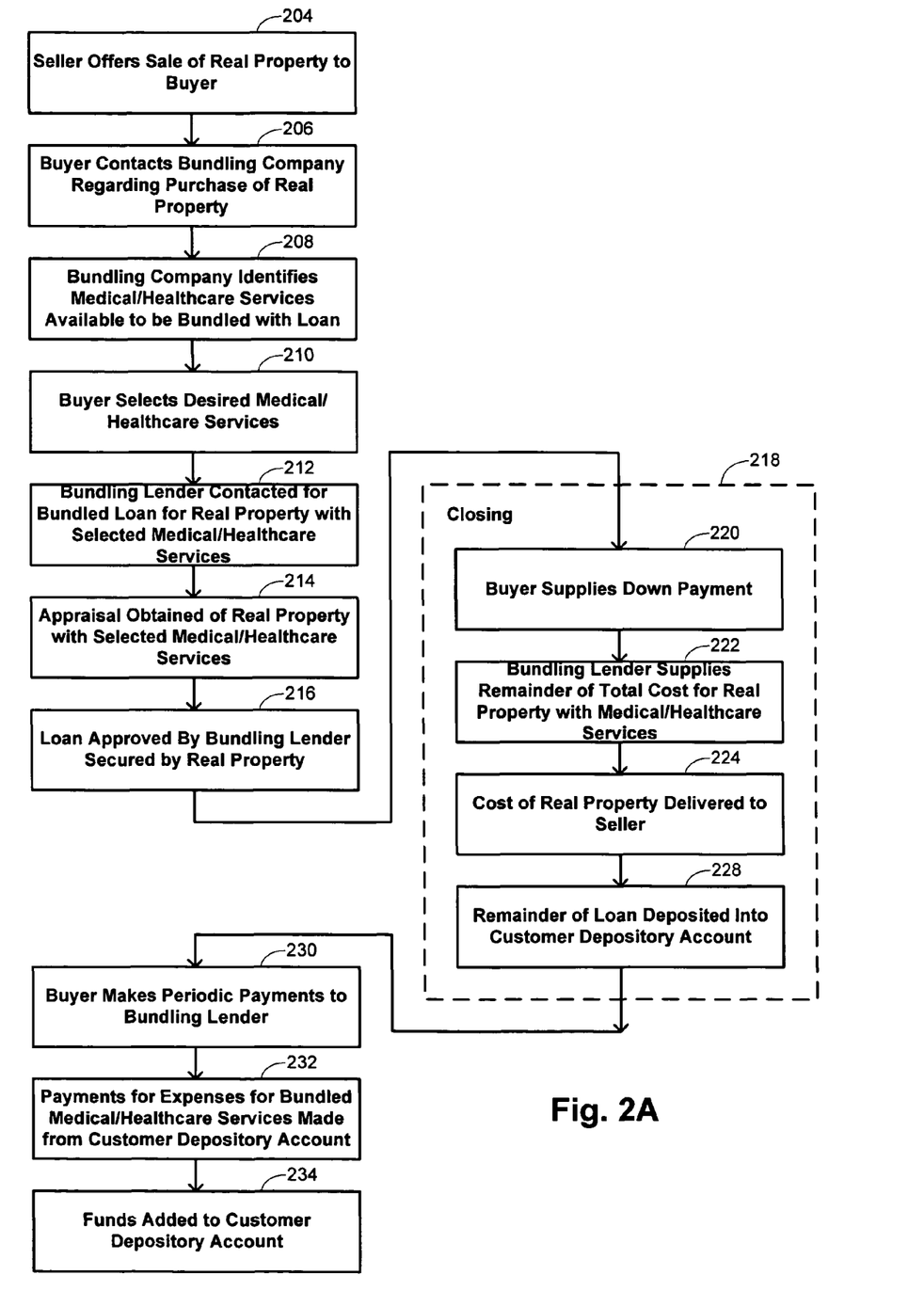
FIG. 2A is a flow diagram illustrating a method for financing medical and healthcare services with a loan secured by real property in a first embodiment.

At block 212, a bundling lender 212 is contacted for solicitation of a bundled loan for the real property with the selected medical and healthcare services. The cost presented to the buyer 110 may incorporate the value of the selected medical and healthcare services into the cost or may alternatively include a separate listing of the cost for the bundleable medical and healthcare services. In either instance, the bundling lender 112 may consider the cost or value of the selected medical and healthcare services when qualifying the buyer 110 for the loan. In some embodiments, qualifying the buyer 110 may comprise obtaining an appraisal of the real property with the selected medical and healthcare services as indicated at block 214, but this is not necessary in other embodiments. The appraisal may be obtained by the buyer 110, by the bundling lender 112, or by a bundling company 102 in different embodiments. If the buyer 110 qualifies for the loan, it is approved by the bundling lender 112 at block 216.

In determining whether to approve the loan request, the bundling lender may calculate a "back-end ratio" as a measure of the borrower's ability to repay the loan using techniques known in the art. A high back-end ratio may disqualify a borrower from obtaining a loan. Embodiments of the invention advantageously lower the back-end ratio by eliminating certain borrower payments related to medical and/or healthcare expenses. For example, by financing the borrower's monthly prescription costs, medical insurance, and other healthcare expenses in a loan, the back-end ratio may be reduced, permitting the borrower to qualify for a larger loan amount. Lowering the back-end ratio also advantageously permits the bundling lender to modify its underwriting procedures, making the borrower's loan qualification easier. It also permits the lender to structure and offer new loan products that are based on this ability to lower the back-end ratio and other defaulting events. In particular, this capability is advantageous in structuring new loan products that may be attractive for sale in the secondary mortgage marketplace. Embodiments of the invention also advantageously expand the ability of bundling lenders to make new types of loans to new borrowers and to enter new markets by developing active partnerships with medical and healthcare professionals, vendors of medical and healthcare policies, pharmaceutical suppliers, and other medical and healthcare service providers.

When the loan is to close, as indicated in the drawing generically by blocks 218, the buyer 210 typically supplies a down payment at block 220, although in some embodiments the loan might be provided without a down payment. The bundling lender 112 supplies the remainder of the total cost for the real property and the medical and healthcare services that are bundled in the loan, as indicated at block 222. The cost of the real property is delivered to the seller 111 at block 224, and the remainder of the loan amount is deposited into the customer depository account 114 at block 228. In some instances, other products and services may be bundled into the loan, in addition to the medical and/or healthcare services described in detail herein. A detailed description of a variety of products and services that may be bundled is provided in the parent and related applications, which have been incorporated herein by reference. When some of those other products and services are also bundled, the funds deposited in the customer depository account are earmarked for payment of both healthcare and medical expenses as well as expenses related to those other bundled products/services.

The customer depository account 114 may comprise any suitable account, such as a trust account, an interest-bearing account, an insurance account, or a bank account, and in some embodiments the customer depository account 114 may comprise a plurality of accounts, which may be maintained by a plurality of different institutions. In some instances, separate customer depository accounts may be provided for different classes of medical and healthcare services or a single customer depository account may be segregated for separate tracking of different classes of products. If other types of products or services are also being financed in this way, the segregation of the customer depository account or the use of multiple customer depository accounts may be used to monitor medical/healthcare expenses separately from other types of expenses. Once the funds have been received in the customer depository account 114, the bundled medical and healthcare services are assigned to the sold property, rather than to the borrower, and become an asset of the property, thereby conferring on them the status of a real-property interest. The funds in the customer depository account 114 may thereafter be used to make payments for the recurring expenses of the bundled medical and healthcare services. The bundling lender 112 may be issued a document entitling the bundling lender 112 to foreclose on the customer depository account upon a default of the bundling loan by the borrower. The document typically identifies the funds being held in the customer depository account 114, as well as designating the funds as a "prepaid asset" of the property. The bundling lender 112 and/or buyer 110 are generally provided with the ability to obtain via telephone and/or electronic mechanisms the current cash balance in the customer depository account.

The total loan amount includes the amount of payments for the future expenses used in supporting the bundled medical and healthcare services. The future payment amount for payments on both the bundled medical and healthcare services and on the property are amortized over the term of the loan. The loan term may advantageously have a term as long as 30 years (or even as long as 40 years in the case of some real-property loans). This is in contrast to consumer loans, which usually have terms of less than five years. In addition, using a structure that has a real-property loan with a real-property interest may provide tax advantages, such as in the United States where interest on real-property loans may be tax deductible. It is noted that this benefit is a consequence of the designation of the prepaid assets as real-property interests. In the United States, Freddie Mac and Fannie Mae were chartered by Congress to provide liquidity to the mortgage banking industry and are purchasers of more than 90% of the mortgage loans that originate in the U.S. In their charter, Freddie Mac and Fannie Mae could only purchase loans from mortgage banks that are real property and that do not include personal property. This is why a stand-alone television could not be financed within a mortgage, but a home theatre could. In response to consumer demand and a request from the National Association of Realtors, Freddie Mac designated certain appliances as providing a "real-property interest," that permits their cost to be financed with a mortgage loan.

After closing, the buyer makes periodic payments to the bundling lender at block 230, similar to conventional mortgage payments. These payments may be made monthly, biweekly, or according to some other arrangement. In some embodiments, additional principal payments may also be accepted with the periodic payments to the bundling lender. The payments for the costs of the medical and/or healthcare services are made from the customer depository account at block 232. The duration of the useable period of the bundled medical and healthcare services may be more or less than the original term. For example, the borrower may use more services, resulting in more funds being withdrawn from the customer depository account 114. In this instance, the usable term of the bundled medical and healthcare services would be less than the initial term because the customer depository account will be depleted faster than initially planned. Conversely, the borrower may use less or fewer bundled medical and healthcare services, resulting in fewer funds being withdrawn from the customer depository account. In that case, the term of the bundled medical and healthcare services is longer than the initial term because the funds in the customer depository account 114 will last longer. As indicated at block 234, funds may sometimes be added to the customer depository account to lengthen the usable term of the bundled medical and healthcare services. Funds may be added by the buyer in some embodiments, or may be added by other entities such as the bundling company 102 or by the bundling lender 112 as part of a variety of possible incentive programs. In some embodiments where separate tracking for different classes of products is provided through the use of a segregated account or through the use of a plurality of accounts, transfers between the different classes may be enabled.

Figure 2B:
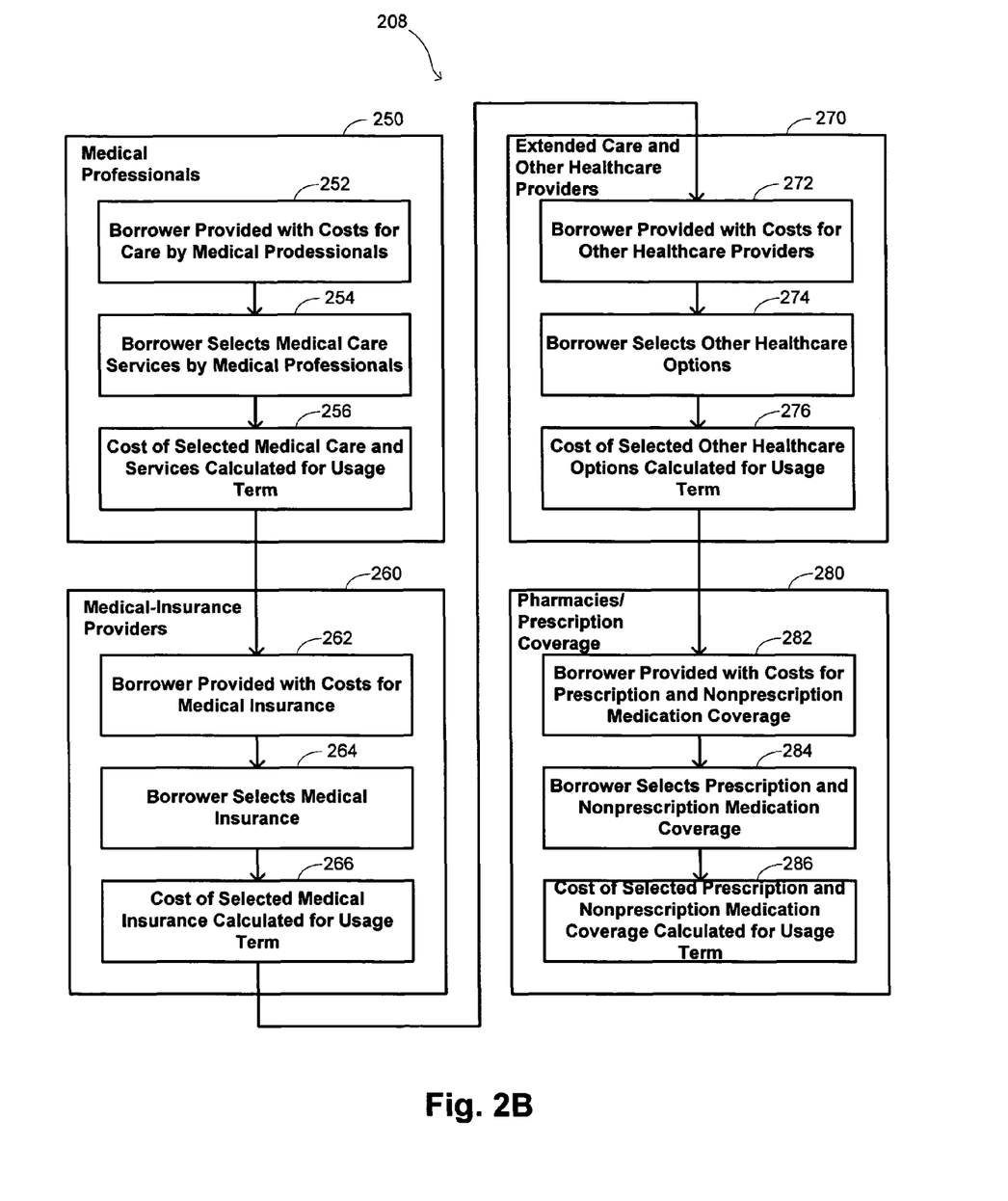
FIG. 2B is a flow diagram illustrating a method for selecting and calculating the costs of medical and healthcare products to be bundled with a loan secured by real property.

Further details of the types of selections that may be made by the borrower at block 208 for medical and/or healthcare services are provided with the flow diagram of FIG. 2B. This diagram is divided into several major categorizations of the types of services that may be bundled with a loan according to embodiments of the invention, but these categorizations are not intended to be exclusive and there are other categorizations that will be evident to those of skill in the art upon reading this disclosure. Block 250 identifies options that the borrower may have to select services of medical professionals, such as general medical practitioners, medical specialists, and the like. At block 252, the borrower is provided with costs for care by such medical professionals, enabling the borrower to select those medical-care services that are desired. The cost of the selected medical-care services is calculated for a specified usage term, such as for a term of five years, at block 256.

A similar procedure is used for the selection of medical-insurance providers at block 260, which may include specialized insurance for specialized procedures, such as vision insurance, dental insurance, and the like. The borrower is provided with costs for medical insurance, perhaps for a number of different providers, at block 262. The borrower selects the desired medical insurance at block 264, permitting the cost of the selected medical insurance to be calculate for a specified usage term, such as for a term of five years, at block 266.

The selection of services for extended care and services from other healthcare providers occurs generally at block 270. Extend-care services may include nursing-home services, long-term-care assistance services, hospice services, and the like. The scope of other healthcare providers is intended to be broad, including such diverse services as laboratory services, midwife services, x-ray services, MRI services, CAT-scan services, mammography services, and the like. At block 272, the borrower is provided with costs for such extended care and other healthcare provider services, permitting the borrower to make a selection of such services at block 274. The cost of the selected options is calculated for a specified term of usage at block 276.

Block 280 indicates the selection of pharmacy and prescription services, which includes providing the borrower with costs for prescription and nonprescription medication coverage at block 282. After the borrow selects the prescription and nonprescription medication coverage that is desired, the cost of the selections is calculated for a specified usage term. The various costs of the selections made by the borrower in each of blocks 250, 260, 270, and 280 are totaled in order to update the loan cost at block 214 of FIG. 2A.

A similar method may be implemented in embodiments where an existing homeowner wishes to refinance an existing mortgage or wishes to take a home-equity line of credit secured by the real property. These embodiments are illustrated with the flow diagram of FIG. 3 and have a number of aspects in common with aspects of the invention described in connection with FIG. 2A. The homeowner contacts the bundling company 102 at block 304 or block 306 depending on the embodiment, again having the ability to make use of a variety of different informational tools to identify the bundling lender and perhaps making contact through a third party. Block 304 applies to homeowners seeking to refinance existing mortgages and block 306 applies to homeowners seeking a home-equity line of credit. Home-equity lines of credit are loans in which the borrower secures the loan with real property. They provide borrowers with long-term financing at attractive interest rates when compared with consumer loans that have relatively short terms and much higher interest rates. They differ from mortgages, which are used to finance the purchase of real estate. Highly developed markets exist for both mortgages and home-equity lines of credit, with lender being compensated with interest on the principal that is lent.

Figure 3:
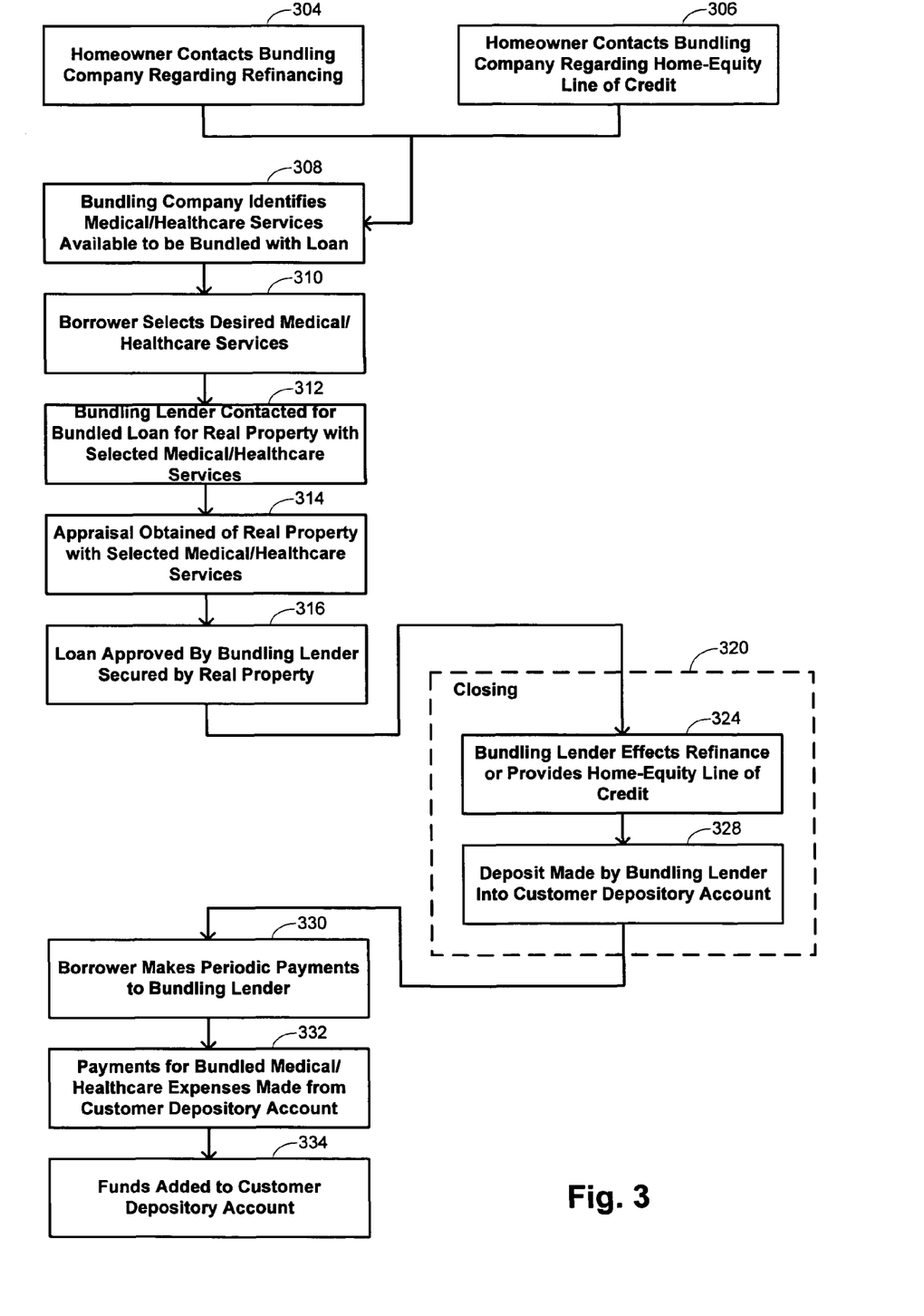
FIGS. 3 and 4 are flow diagrams illustrating methods for financing medical and healthcare services with a loan secured by real property in other embodiments of the invention.

In either instance, the bundling company 102 may identify a number of medical and healthcare services that may be bundled with the loan at block 308. The borrower selects those medical and healthcare services he wishes to include with the loan at block 310, including specification of a term for services if appropriate. A bundling lender 112 is contacted at block 312 with a request to provide a bundled loan for the real property and the selected medical and healthcare services. The total loan cost is determined by amortizing the cost of both the underlying loan and the cost of the selected goods and services. An optional appraisal may be obtained at block 314, with the loan being approved by the bundling lender at block 316 if the borrower meets the loan requirements.

At closing 320, the bundling lender 112 provides the refinancing or home-equity line of credit at block 324 and deposits funds into the customer depository account 114 at block 328. The bundling lender 112 is provided at closing with a document asserting its right to foreclose against the customer depository account 114 as well as against the real property itself in the event of a default. After closing, the relationship between the borrower and bundling lender is similar to that described above. The borrower makes periodic payments to the bundling lender as indicated at block 330 and payments for the medical and/or healthcare expenses are made from the customer depository account as indicated at block 332. Similar to the embodiments described in connection with FIG. 2A, the usable term of the bundled medical and healthcare services may be longer or shorter than initially planned, depending on the rate at which the funds are used. A provision is therefore provided at block 334 to permit funds to be added to the customer depository account to extend its usable term, either by the borrower or by another entity such as the bundling company 102 or bundling lender 112 in different embodiments.

Figure 4:
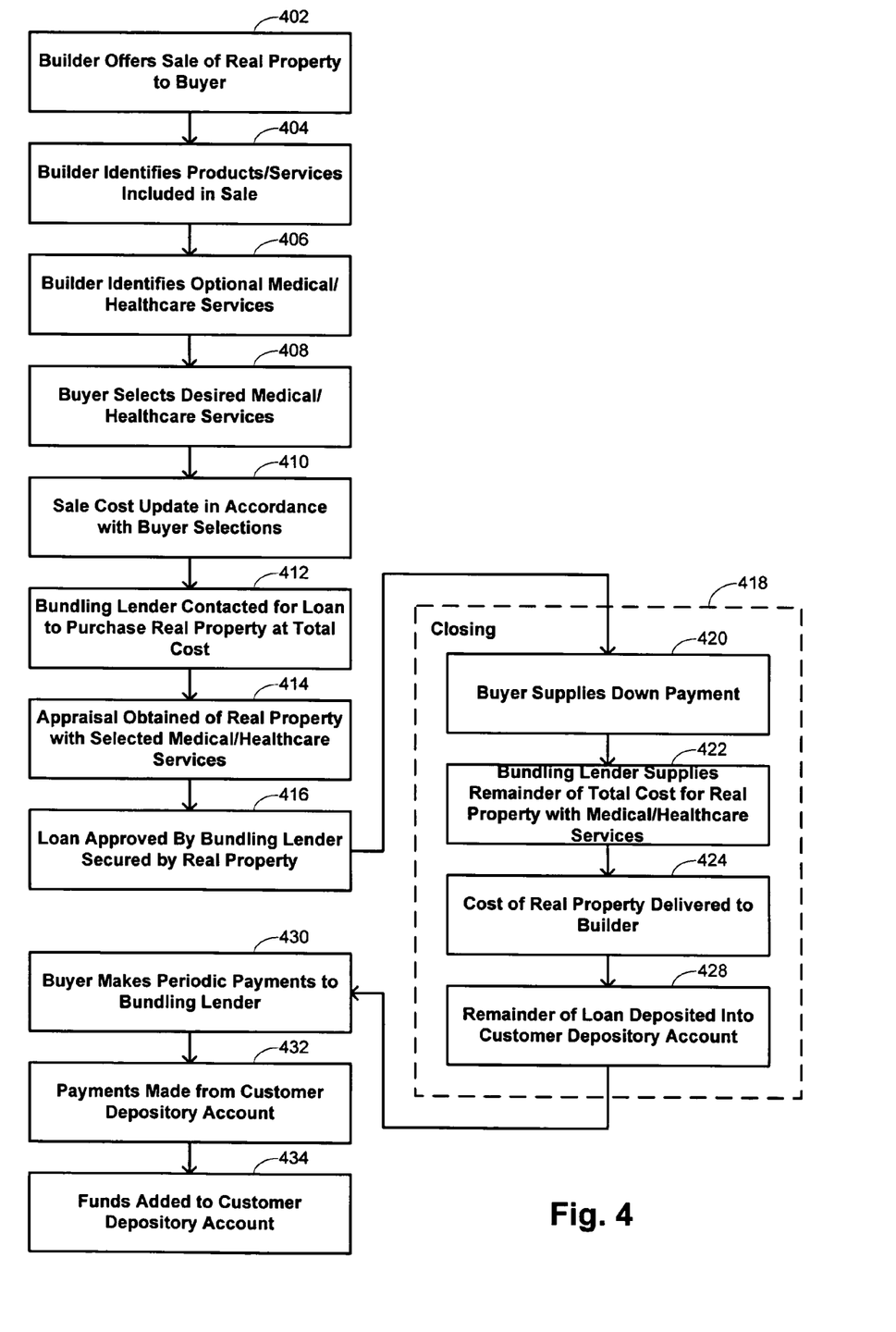

FIG. 4 provides a similar flow diagram, but reflects aspects of the invention relevant to land development by a builder. This embodiment provides an example where one of the parties to the sale transaction for real property acts as the bundling company with the builder taking on this role, although in alternative embodiments a separate bundling company may work with the builder and buyer. The builder generally provides new construction, offering the sale of real property to a buyer at block 402. Because the builder is providing new construction, the range of options that may be provided as part of the construction is diverse. There may be both fixed-cost options and recurring-cost options. Traditional fixed-cost options include such enhancements as wood cabinetry, granite countertops, gold bathroom fixtures, upgraded carpet, and the like. In addition to providing the buyer with optional medical and healthcare services, the builder may in some embodiments include certain recurring-cost products or services as part of the standard purchase arrangement. For instance, in one embodiment, the builder may advertise that the sale of each home includes, as standard, five years of health-insurance payments and may offer options to provide certain other medical and healthcare costs at the option of the buyer—these may be marketed as "upgrades." The standard items are identified to the buyer at block 404 and the optional items are identified to the buyer at block 406.

In response to the buyer making a selection of desired medical and/or healthcare services at block 408, the sale cost is update at block 410 by amortizing the total cost of both the standard and upgrade aspects. The selection of desired medical and healthcare services at block 408 may be performed in some embodiments as described in connection with FIG. 2B above. The bundling lender 112 is contacted at block 412, either by the buyer, by the builder, or through another third party, and asked to provide terms for a loan to purchase real property with the selected medical and/or healthcare services, as well as any other options that may have been selected. The bundling lender 112 performs an analysis to determine whether to approve the loan, and performing that analysis may sometimes include obtaining an appraisal of the property with the selected medical and healthcare services at block 414. Approval of the loan by the bundling lender is indicated at block 416 and, as previously noted, may comprise calculation of a back-end ratio that accounts for the reduction in medical and/or healthcare expenses faced by the borrower as a result of their bundling with the loan.

Closing is denoted generally by blocks 418. As part of closing on the loan, the buyer may supply a down payment at block 420, although in some embodiments the loan may close without any downpayment. The bundling lender 112 supplies the remainder of the cost for purchase of the real property as well as for financing the costs of the selected medical and healthcare services at block 422. The cost of the real property is delivered to the builder at block 424 and the remainder of the loan amount is deposited into the customer depository account 114 at block 428. The bundling lender 112 is also provided with documentary authority to foreclose on the customer depository account as well as on the real property in the event that the borrower defaults.

After closing 418, the builder is no longer involved. The buyer makes periodic payments to the bundling lender 112 at block 430 to satisfy his obligations under the loan arrangement. Payments for medical and/or healthcare expenses are made at block 432 from the customer depository account. The payments may be made periodically for those expenses that occur periodically or may be made as needed for payment of nonperiodic expenses. As previously noted for other embodiments, the length of time that the customer depository account may cover expenses may vary, depending on how much is actually spent in satisfying those expenses. In cases where the term that the account covers is less than originally expected, a mechanism may exist in some embodiments to add additional funds to the customer depository account at block 434, such as by the buyer or by another entity like the bundling company or bundling lender.

In some cases, for any of the embodiments described in connection with FIGS. 2A-4, the owner of real property that secures a loan that bundles medical and/or healthcare services may wish to sell the property. The funds in the customer depository account may be treated in a number of different ways in different embodiments. For instance, in some cases, the owner may transfer the funds from the customer depository account to a subsequent buyer of the property. In other cases, the owner may transfer the funds to a new property that the owner purchases.

The descriptions of certain embodiments of the invention above are not intended to be exhaustive and may be accommodated within a wide range of lending products. For example, the loan may comprise any of the following in different embodiments: a first mortgage secured by the property and perhaps also by the cash value of the medical and healthcare services; a second mortgage secured by the property and perhaps also by the cash value of the medical and healthcare services; a third mortgage secured by the property and perhaps also by the cash value of the medical and healthcare services; a refinanced mortgage secured by the property and perhaps also by the cash value of the medical and healthcare services; a home-equity loan secured by equity in the real property and perhaps also by the cash value of the medical and healthcare services; a home-equity line of credit secured by equity in the real property and perhaps also by the cash value of the medical and healthcare services; a construction loan secured by the real property and perhaps also by the cash value of the medical and healthcare services; and a personal note secured by the real property and perhaps also by the cash value of the medical and healthcare services. In some instances, a plurality of loans may be used to finance the medical and healthcare services, such as when they are financed through a first and second mortgage.

Each of the descriptions of FIGS. 2A-4 above have noted that in some instances an appraisal may be sought, such as part of the loan-qualification process. An overview of methods that may be used to perform an appraisal in provided with the flow diagram of FIG. 5. This method illustrates how the effect of bundling medical and/or healthcare services with the loan may be accommodated as part of the appraisal. It is noted that in some embodiments the real property that is the subject of the appraisal may already have a customer depository account associated with it and classified as a prepaid asset of the property. This is true, for instance, in some embodiments described in connection with FIG. 2A where an existing home might be sold to a new owner. Such a pre-existing customer depository account may be used for payment of medical and healthcare expenses or could be used for payment of other types of expenses like those described in detail in the related and parent applications.

Figure 5:
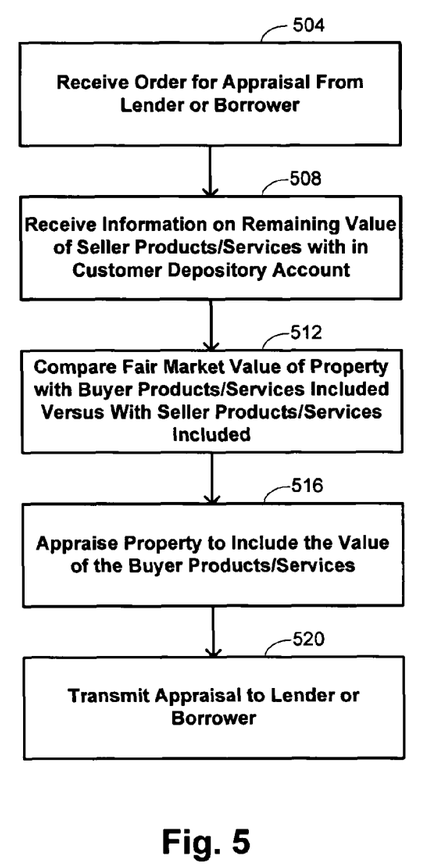
FIG. 5 is a flow diagram illustrating a method for obtaining an appraisal in concert with the methods of FIGS. 2A-4 in some embodiments.

At block 504 of FIG. 5, an appraiser 116 receives an order for an appraisal, usually from a bundling lender or from a borrower, although in some instances the request for an appraisal may be transmitted from the bundling company or through some third party. The appraiser 116 collects information on the remaining value of products and/or services, including healthcare and medical services supported by a customer depository account associated with the property, as indicated at block 512. This value acts to increase the base value of the property. These products and/or services are termed "seller products/services" because they represent a prepaid asset of the seller's property and are distinct from the "buyer products/services" that the buyer wishes to bundle. In embodiments where the seller has no customer depository account to draw on for payment of recurring expenses, such as where the seller is a builder or where the seller arranged a loan without such a structure, the base value is equal to the value only of the real property. At block 512, the appraiser compares the fair market value of the property with the buyer products/services included with its value without the buyer products/services but including the seller products/services, if any. The difference between the two is assigned as a valuation difference to the property. In most instances, it is expected that the valuation difference will be a valuation increase, such as when there are no seller products/services or when the value of the seller's customer depository account has been depleted through prior payments. The property is accordingly appraised to include the value of the buyer products/services at block 516 and the appraisal is transmitted to the lender or borrower at block 520.

Figure 6:
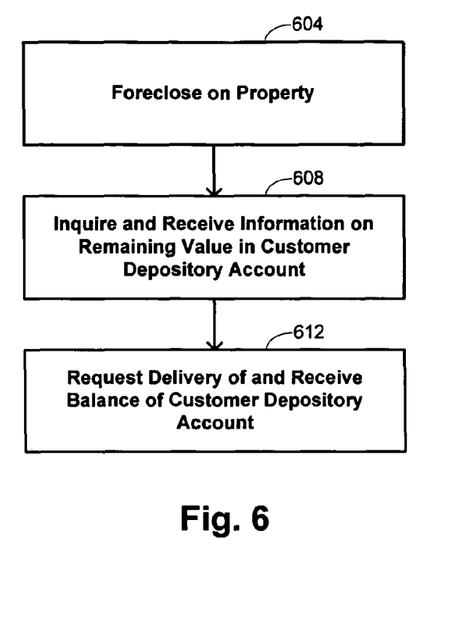
FIG. 6 is a flow diagram illustrating the effect of default on a loan that finances medical and healthcare services in accordance with embodiments of the invention.

Because of the nature of the classification of funds held within the customer depository account as a prepaid asset of the property, that value is subject to foreclosure in the event of a default on the loan provided by the bundling lender. The authority for the bundling lender to foreclose against the funds held within the customer depository account may be provided with a document showing the classification of the funds as a prepaid asset. FIG. 6 provides a flow diagram illustrating the effect of foreclosure according to an embodiment of the invention. At block 604, the bundling lender 112 forecloses on the real property itself in a conventional manner. In addition, as indicated at block 608, the bundling lender 112 may receive information setting forth the remaining value in the customer depository account 114, thereby enabling the bundling lender 112 to request delivery of and receive the balance of the account at block 612. In some embodiments, the bundling lender 112 may alternatively provide instructions for the funds in the customer depository account to be assigned to a new designated real property or to a new buyer of the current designated property or to a supplier.

Figure 7:
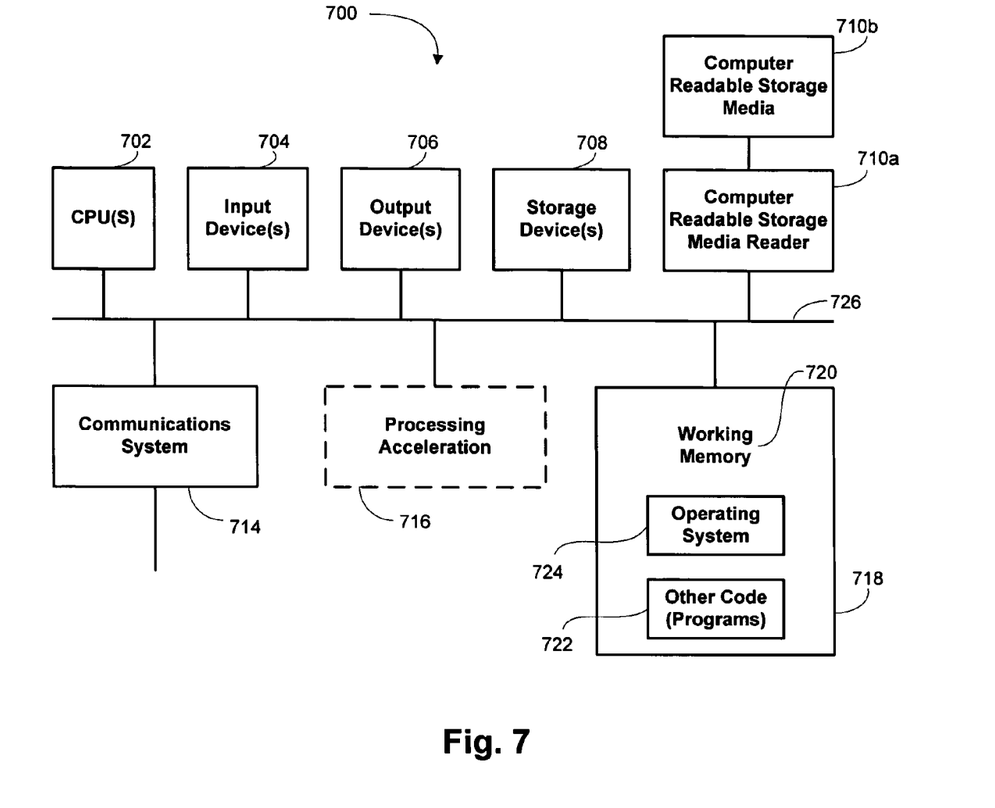
FIG. 7 is a schematic block diagram illustrating the structure of a computer system on which methods of the invention may be embodied.

In many embodiments, the methods described in connection with FIGS. 2A-6 may be coordinated by computational devices that provide connectivity as shown with the schematic drawing of FIG. 1. A typical structure for such computational devices is shown in FIG. 7, which broadly illustrates how individual system elements may be implemented in a separated or more integrated manner. The computational system 700 is shown comprised of hardware elements that are electrically coupled via bus 726, including a host processor 702, an input device 704, an output device 706, a storage device 708, a computer-readable storage media reader 710a, a communications system 714, a processing acceleration unit 716 such as a DSP or special-purpose processor, and a memory 718. The computer-readable storage media reader 710a is further connected to a computer-readable storage medium 710b, the combination comprehensively representing remote, local, fixed, and/or removable storage devices plus storage media for temporarily and/or more permanently containing computer-readable information. The communications system 714 may comprise a wired, wireless, modem, and/or other type of interfacing connection and permits data to be exchanged with the other computational devices such as illustrated by the schematic arrangement of FIG. 1 to implement embodiments as described.

The computational device 700 also comprises software elements, shown as being currently located within working memory 720, including an operating system 724 and other code 722, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

EXAMPLES

Certain benefits and advantages of embodiments of the invention are evident from the following description of specific examples.

Example No. 1

In a first example, a consumer wishes to increase monthly cashflow by lowering monthly cash expenses. As part of a refinancing of the consumer's home mortgage to reduce the payment by taking advantage of a reduction in interest rates, the customer bundles health insurance for a family having a retail monthly price of $500.00. By using a mortgage loan amortized over 30 years, the monthly cash expense for the health insurance is reduced to about $145.00.

Example No. 2

In a second example, a prospective homeowner anticipates paying an average of about $222 per month for medical and healthcare premiums, in addition to about $192 in monthly costs for prescription drugs, for total monthly expenses of $414. Over five years, the prospective homeowner thus expects to pay about $24,840 for these medical and healthcare services. The prospective homeowner decides to purchase a home having a base appraised value of $200,000 and to bundle these costs with the mortgage. The total appraised value is the sum of the base appraised value of the home and the five years of medical/healthcare services for a total of $224,840. The homeowner closes by making a 20% down-payment on a 6%-interest loan, providing a mortgage amount of $179,872. The borrower's mortgage payment is thus $1078/month. If the borrower had taken a loan only on the real property for 80% of the $200,000, his mortgage payment would have been $959/month. While the increase in the loan payment is $119/month, the monthly expenses of $414 have been eliminated since they are paid from an associated customer depository account, providing the homeowner with a monthly cashflow increase of $295.

This advantage may be exploited further by noting that the mortgage interest is tax deductible in the United States. Using a 30% combined state and federal tax rate, the "after tax" value of the $119/month difference in payments is effectively $83, providing the homeowner with $331/month in increased average cashflow.

Example No. 3

In a third example, the same scenario as presented in Example No. 2 is repeated, with the homeowner this time investing the additional cashflow in an interest-bearing account at a 5%/year interest rate. At the end of the 60 months of paid services, the savings accumulation would by $25,124. This corresponds to an average monthly increase in cash flow of $419, more than the cost of the services being financed. While the effective cost of the services averaged over 60 months might be $500/month because of rate increases, the average cost to the homeowner is fixed in accordance with the invention at a negotiated rate of $414. Since the average increase by investing the savings exceeds this fixed cost, the homeowner has effectively received the bundled services for free.

The homeowner is also insulated from price volatility of the services. A spike in medical or healthcare costs as a result of illness or accident will not force the homeowner into a circumstance where he must make a decision of whether to pay the mortgage or make the healthcare payment. This is beneficial not only to the homeowner, but also to the lender who is insulated from circumstances that not uncommonly result in mortgage defaults.

Example No. 4

In a fourth example, the same scenario as presented in Example No. 3 is repeated, with the homeowner deciding to pay off the mortgage at the end of the five-year period. The mortgage balance is $167,379, which may be compared with a balance of $148,887 that would have resulted if the borrower had financed only the real property at $200,000. The difference in pay-off amounts is $18,492, which is more than offset by the accumulated savings of $25,124, the homeowner being $6632 ahead of a conventional arrangement.

Example No. 5

In a fifth example, the same scenario as presented in Example No. 3 is repeated, with the homeowner deciding to renew the arrangement and purchase another five-year term of services. This can be done in at least three different ways: (1) by refinancing the home and including another five-year term of bundled services; (2) by keeping the first mortgage and obtaining a home-equity line of credit to pay for and bundle the services; or (3) by paying retail for the medical and healthcare services. If the homeowner chooses the first option, the accumulated savings at the end of 30 years would by approximately $312,630, with a net savings after paying off the mortgage differential of $153,274. If the homeowner chooses the second option, the overall accumulated savings at the end of 30 years would be approximately $238,478, with a net savings of $84,105. If the homeowner chooses the third option, the overall accumulated savings at the end of 30 years would by $28,102, with a net savings of $28,102.

Example No. 6

In a sixth example, a bundling lender simultaneously originates a first mortgage loan and a second mortgage loan. The cost of the bundled medical and healthcare services are included in the second mortgage loan. This permits the buyer of the real property to acquire both it and the bundled medical and healthcare services for "no money down." For example, the first mortgage may be an 80% loan-to-value loan, leaving 20% equity available for the second mortgage. For a property having an appraised value of $200,000, including $15,000 of bundled medical and healthcare services, the 80% loan is for $160,000 and the second mortgage is for $40,000. At the loan closings, the second mortgage loan funds the customer depository account in the amount of $15,000 for satisfying recurring expenses for the medical and healthcare services. The borrower benefits by not having to use any cash to purchase the property and the bundled medical and healthcare services, as well as by avoiding the mortgage-insurance requirement attached to loans of 90% loan-to-value or greater. The bundling lender considers the cost of the bundled medical and healthcare services in qualifying the borrower for two loans, one being a bundled loan, and may order an appraisal and identify the bundled medical and healthcare services with the property. Once the borrower qualifies for the bundled loan, the bundling lender commits the funds for payment of the recurring medical and healthcare services and distributes the funds in accordance with a predetermined agreement.

Example No. 7

In a seventh example, a homeowner decides to sell his present home with a balance remaining in the customer depository account. The homeowner transfers the remaining funds in the customer depository account to the new purchaser of the existing property.

Example No. 8

In an eighth example, a homeowner decides to sell his present home with a balance remaining in the customer depository account. The homeowner transfers the remaining funds in the customer depository account to the new, second property.

Thus, having described several embodiments, it will be recognized by those of skill in the art that various modifications, alternative constructions, and equivalents may be used without departing from the spirit of the invention. For example, in some alternative embodiments the use of a customer depository account may be avoided by having funds for payment of medical and healthcare expenses forwarded directly at closing to associated entities. Accordingly, the above description should not be taken as limiting the scope of the invention, which is defined in the following claims.

What is claimed is:

1. A method for providing a loan to a borrower, the method comprising:
   receiving, at a host system, an identification of real property and a specification of medical and/or healthcare services;
   calculating, with the host system, a total loan value for the real property and specified medical and/or healthcare services;
   requesting, with the host system, approval of the loan secured by the real property for the total loan value; and
   initiating, with the host system, a closing on the loan at which a customer depository account is funded to provide future funds for payment of expenses for the medical and/or healthcare services.

2. The method recited in claim 1 wherein the loan is also secured by the specified medical and/or healthcare services.

3. The method recited in claim 1 wherein approval of the loan comprises:
   initiating an appraisal of the value of the property with the specified medical and/or healthcare services; and
   calculating a back-end ratio that omits consideration of separate payment of the expenses by the borrower.

4. The method recited in claim 1 further comprising designating funds in the customer depository account as a prepaid asset linked with the real property, whereby the funds in the consumer deposit account comprise a real-property interest.

5. The method recited in claim 1 wherein:
   the loan comprises a mortgage; and
   the borrower is a buyer of the real property.

6. The method recited in claim 1 wherein:
   the loan comprises a refinance mortgage; and
   the borrower is an owner of the real property.

7. The method recited in claim 1 wherein:
the loan comprises a home-equity loan or a home-equity line of credit; and
the borrower is an owner of the real property.

8. The method recited in claim 1 further comprising initiating payment of the expenses when due.

9. The method recited in claim 1 wherein at least some of the expenses comprise periodic expenses, the method further comprising periodically initiating payment of the periodic expenses.

10. The method recited in claim 1 further comprising initiating foreclosure against the real property and against the customer depository account in response to a default by the borrower on terms of the loan.

11. The method recited in claim 1 further comprising initiating a release of the customer depository account for a benefit of a new purchaser of the real property while maintaining an association of the customer depository account with the real property.

12. The method recited in claim 1 further comprising initiating a transfer of funds remaining in the customer depository account to a new property purchased by a current owner of the real property after a sale of the real property.

13. The method recited in claim 1 further comprising increasing a value of the customer depository account by depositing funds provided by the borrower after closing into the customer depository account, whereby a useable term of the customer depository account for payment of the expenses is extended.

14. The method recited in claim 1 further comprising transmitting over a network from the host system a specification of terms for the loan to permit the borrower to select the loan from a plurality of loans with specified terms.

15. The method recited in claim 1 further comprising:
receiving a specification of products and/or services distinct from the medical and/or healthcare services,
wherein:
calculating the total loan value comprises calculating the total loan value for the real property, the specified medical and/or healthcare services, and the products and/or services distinct from the medical and/or healthcare services; and
the customer depository account is funded to provide future funds for payment of the expenses for the medical and/or healthcare services and for payment of expenses for the products and/or services distinct from the medical and/or healthcare services.

16. The method recited in claim 15 wherein the customer depository account comprises a plurality of customer depository accounts, each of the plurality of customer depository accounts being identified with a distinct subset of the products and/or services and the medical and/or healthcare services.

17. The method recited in claim 16 further comprising effecting a transfer of funds among at least some of the plurality of customer depository accounts.

18. The method recited in claim 15 wherein the customer depository account is segregated for separate tracking of funds identified with distinct subsets of the products and/or services and the medical and/or healthcare services.

19. The method recited in claim 18 further comprising changing an identification of the funds among the distinct subsets.

20. The method recited in claim 1 wherein the specification of medical and/or healthcare services comprises specification of a term for the medical and/or healthcare services.

21. A computer-readable storage medium having a computer-readable program embodied therein for directing operation of a computer system for a bundling lender, the computer system including a communications system, a processor, and a storage device, wherein the computer-readable program includes instructions for operating the computer system to provide a loan to a borrower in accordance with the following:
receiving an identification of real property and a specification of medical and/or healthcare services;
calculating a total loan value for the real property and specified medical and/or healthcare services;
requesting approval of the loan secured by the real property for the total loan value; and
initiating a closing on the loan at which a customer depository account is funded to provided future funds for payment of expenses for the medical and/or healthcare services.

22. The computer-readable storage medium recited in claim 21 wherein the computer-readable program further includes instructions for:
initiating an appraisal of the value of the property with the specified medical and/or healthcare services; and
calculating a back-end ratio that omits consideration of separate payment of the expenses by the borrower.

23. The computer-readable storage medium recited in claim 21 wherein the computer-readable program further includes instructions for initiating foreclosure against the real property and against the customer depository account in response to a default by the borrower on terms of the loan.

* * * * *